United States Patent
Aoyagi et al.

(10) Patent No.: US 9,466,835 B2
(45) Date of Patent: *Oct. 11, 2016

(54) CATHODE ACTIVE MATERIAL

(71) Applicant: HONDA MOTOR CO., LTD., Tokyo (JP)

(72) Inventors: Shintaro Aoyagi, Saitama (JP); Yuji Isogai, Saitama (JP); Akihiro Yoshizawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,698

(22) Filed: Feb. 13, 2015

(65) Prior Publication Data

US 2015/0236348 A1    Aug. 20, 2015

(30) Foreign Application Priority Data

Feb. 18, 2014 (JP) ................................. 2014-028701

(51) Int. Cl.

| | |
|---|---|
| *H01M 4/58* | (2010.01) |
| *C01G 49/00* | (2006.01) |
| *C01G 51/00* | (2006.01) |
| *C01G 53/00* | (2006.01) |
| *H01M 4/38* | (2006.01) |
| *H01M 4/136* | (2010.01) |
| *C01B 9/08* | (2006.01) |
| *C01B 7/20* | (2006.01) |
| *H01M 10/052* | (2010.01) |
| *H01M 10/054* | (2010.01) |

(52) U.S. Cl.
CPC ............ *H01M 4/582* (2013.01); *C01G 49/009* (2013.01); *C01G 49/0027* (2013.01); *C01G 51/006* (2013.01); *C01G 53/006* (2013.01); *C01B 7/20* (2013.01); *C01B 9/08* (2013.01); *C01P 2002/02* (2013.01); *C01P 2002/72* (2013.01); *C01P 2006/40* (2013.01); *H01M 4/136* (2013.01); *H01M 4/388* (2013.01); *H01M 10/052* (2013.01); *H01M 10/054* (2013.01)

(58) Field of Classification Search
None
See application file for complete search history.

(56) References Cited

U.S. PATENT DOCUMENTS

| | | | | |
|---|---|---|---|---|
| 2012/0219859 A1* | 8/2012 | Doe | ...................... | C01B 25/372 429/219 |
| 2014/0054517 A1* | 2/2014 | Omichi | ................. | H01M 4/582 252/519.1 |
| 2014/0264190 A1* | 9/2014 | Tong | ..................... | H01M 4/364 252/512 |

FOREIGN PATENT DOCUMENTS

JP    2008-130265    6/2008

OTHER PUBLICATIONS

Kitajou et al. Novel synthesis and electrochemical properties of perovskite type NaFeF3 for a sodium-ion battery. Journal or Power Sources 198 (2012) 389-392.*
Transition metal NaMF3 compounds as model systems for studying the feasibility of ternary Li-M-F and Na-M-F single phases as cathodes for lithium-ion and sodium-ion batteries. Electrochimica Acta (2013) 214-220.*
Understanding the structural and electronic properties of the cathode material NaFeF3 in a Na-ion battery. J Solid State Electrochem (2014) 18:2071-2075.*

* cited by examiner

*Primary Examiner* — Tanisha Diggs
(74) *Attorney, Agent, or Firm* — Rankin, Hill & Clark LLP

(57) ABSTRACT

A cathode active material is provided which has a charge and discharge capacity larger than that of $FeF_3$ when used in a non-aqueous electrolyte secondary battery. The cathode active material for use in secondary batteries with a non-aqueous electrolyte includes an amorphous metal fluoride represented by a general formula $Fe_{(1-x-ny)}Na_xM_yF_{(3-2(x+ny))}$, wherein M is a metal element selected from a group consisting of Co, Ni, Cu, Mg, Al, Zn, and Sn, n represents an oxidation number of the metal element M, $0<x\leq0.4$, and $0\leq y\leq0.1$.

2 Claims, 3 Drawing Sheets

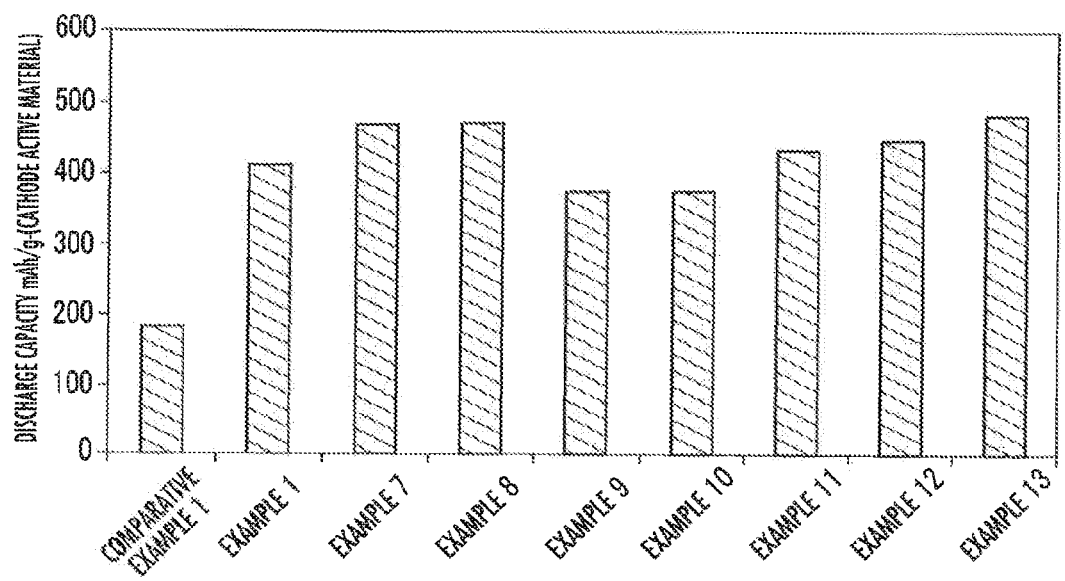

CATHODE ACTIVE MATERIAL

BACKGROUND OF THE INVENTION

1. Field of the Invention

The present invention relates to a cathode active material for non-aqueous electrolyte rechargeable secondary batteries.

2. Description of the Related Art

Metal fluorides represented by a general formula $MF_3$, for example, are known to be used as cathode active materials for non-aqueous electrolyte rechargeable secondary batteries which are used for driving power sources of electric vehicles. (For example, refer to Japanese Patent Laid-Open No. 2008-130265.)

M in the general formula $MF_3$ is one type of a metal element selected from the group consisting of Fe, V, Ti, Co, and Mn. The metal fluorides represented by the general formula $MF_3$ are known to have a high theoretical energy density (reversible capacity). For example, a non-aqueous electrolyte secondary battery containing $FeF_3$ as a cathode active material and Li as an anode active material is considered to have a theoretical energy density of about 240 mAh/g.

SUMMARY OF THE INVENTION

Since the electric vehicle requires a longer travel distance per charge of the non-aqueous electrolyte secondary battery, it is desired that the cathode active materials for the non-aqueous electrolyte secondary battery have a higher charge and discharge capacity.

In view of the circumstances, the object of the present invention is to provide a cathode active material for use in non-aqueous electrolyte secondary batteries, having a charge and discharge capacity higher than that of $FeF_3$.

In order to achieve such an object, the cathode active material of the present invention, which is for use in secondary batteries with an non-aqueous electrolyte, includes an amorphous metal fluoride represented by a general formula $Fe_{(1-x-ny)}Na_xM_yF_{(3-2(x+ny))}$, wherein M is one type of a metal element selected from the group consisting of Co, Ni, Cu, Mg, Al, Zn, and Sn, n represents an oxidation number of the metal element M, $0<x\le0.4$, and $0\le y\le0.1$.

Since the cathode active material of the present invention includes the amorphous metal fluoride, a charge and discharge capacity higher than that of $FeF_3$ can be achieved when used as cathode active material for non-aqueous electrolyte secondary batteries. The reasons for that may be considered as follows, though not being clear.

First of all, the conventionally known $FeF_3$ is a crystalline material having $FeF_6$ octahedral structures in which an Fe ion is surrounded by six F ions, and forms a three-dimensional network in which the F ions share the apex. The charge and discharge reaction of the $FeF_3$ includes an intercalation reaction region and a conversion reaction region.

For example, in the case of using Li ions as anode (negative electrode) active material, the intercalation reaction region includes a reaction region where the Li ions are intercalated into the $FeF_3$ crystal and a reaction region where the Li ions are desorbed. In the intercalation reaction region, the $FeF_3$ allows a Li ion to be intercalated at any of the apex positions of a cube including one $FeF_6$ octahedral structure, so that $Li_xFeF_3$ having a perovskite structure is formed.

On the other hand, the conversion region includes a reaction region where $Li_xFeF_3$ with intercalated Li ions decompose into LiF and Fe and a reaction region where $Li_xFeF_3$ is reproduced from LiF and Fe. The reaction of $Li_xFeF_3$ decomposing into LiF and Fe includes breakage of a bond between an Fe ion and an F ion and formation of a bond between a Li ion and an F ion, which is an anion (F ion) exchange reaction with metal ions (Fe ion and Li ion). In the crystalline material $FeF_3$, the activation energy for breaking the bond between an Fe ion and an F ion is high, so that a high overpotential occurs in the anion exchange reaction.

In contrast, the metal fluorides represented by the general formula $Fe_{(1-x-ny)}Na_xM_yF_{(3-2(x+ny))}$ of the present invention contain Na ions having an ion radius larger than that of Fe in the crystal structure of $FeF_3$, which replaces a part of Fe. As a result, the metal fluorides of the present invention have a larger spacing between the neighboring octahedral structures compared with the crystal structure of $FeF_3$, and takes an amorphous structure.

Consequently, the metal fluorides of the present invention allows the spacing through which Li ions are intercalated or desorbed to be enlarged due to the enlarged spacing between the neighboring octahedral structures, so that Li ions tend to be easily intercalated or desorbed in the intercalation reaction region. It is therefore conceivable that the metal fluorides of the present invention enable an unused region where no Li ion is intercalated in the case of crystalline $FeF_3$ to be used for intercalation and desorption of Li ions, achieving an increased charge and discharge capacity.

In the second place, the metal fluorides of the present invention allow the region available for intercalation and desorption of Li ions to be enlarged in the conversion reaction region along with enlargement of the region available for intercalation and desorption of Li ions in the intercalation reaction region.

In addition, since the metal fluorides of the present invention are amorphous, the bond energy between an Fe ion and an F ion is smaller than that of crystalline $FeF_3$. As a result, it is conceivable that the overpotential occurring during the anion exchange reaction in the conversion reaction region can be reduced.

Furthermore, since the metal fluorides of the present invention including one type of a metal element M selected from a group consisting of Co, Ni, Cu, Mg, Al, Zn, and Sn have a higher electric conductivity than that of $FeF_3$, it is conceivable that the electromotive force in the conversion reaction region increases.

From the reasons described above, it is conceivable that the metal fluorides of the present invention have an increased charge and discharge capacity.

Alternatively, the metal fluorides of the present invention may be metal fluorides not including the one type of metal element M selected from the group consisting of Co, Ni, Cu, Mg, Al, Zn, and Sn in the general formula, which may be represented by a general formula represented by $Fe_{(1-x)}Na_xF_{(3-2x)}$. In this case, x may be in the numeral range of $0<x\le0.4$, preferably $0<x\le0.05$, enabling the charge and discharge capacity of the metal fluorides of the present invention to be particularly increased.

The M in the general formula of the metal fluorides of the present invention is preferably a metal element selected from the group consisting of Co, Cu, and Sn. Consequently, the charge and discharge capacity of the metal fluorides of the present invention can be particularly increased.

BRIEF DESCRIPTION OF THE DRAWINGS

FIG. 3 is a graph showing discharge capacities of metal fluorides in Examples 7 to 13 of the present invention;

DETAILED DESCRIPTION OF THE PREFERRED EMBODIMENTS

Figure 1:
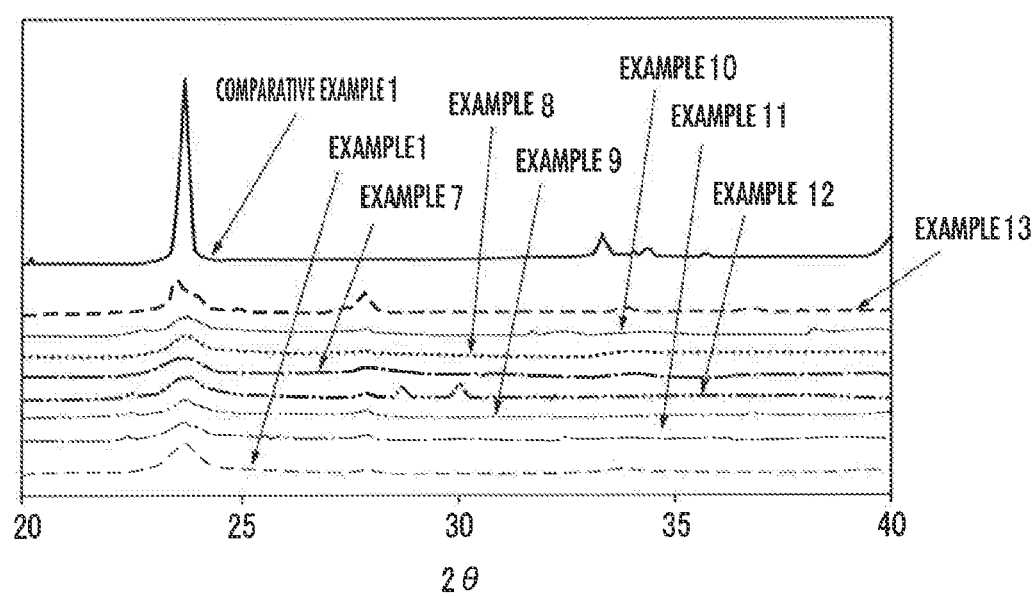
FIG. 1 is a graph showing X-ray diffraction spectra of metal fluorides in Examples 1, and 7 to 13 of the present invention.

Embodiments of the present invention will now be further described in detail by referring to the accompanying drawings.

The cathode (positive electrode) active material of the present embodiment includes an amorphous metal fluoride which is obtained by substituting a part of Fe in $FeF_3$ by another metal element, and represented by a general formula $Fe_{(1-x-ny)}Na_xM_yF_{(3-2(x+ny))}$, wherein M is one type of a metal element selected from a group consisting of Co, Ni, Cu, Mg, Al, Zn, and Sn, n represents an oxidation number of the metal element M, $0<x\leq0.4$, and $0\leq y\leq0.1$.

The amorphous metal fluoride may be prepared, for example, as describe below.

First, iron chloride hexahydrate and a chloride hydrate which contains ions of metal M are dissolved in a solvent, so as to prepare a first solution. Examples of the solvent for use include ultrapure water. The total concentration of iron ions and metal M ions may be in the range of, for example, 0.01 to 0.1 mol/liter.

Subsequently, NaOH is dissolved in a solvent, so as to prepare a second solution. Examples of the solvent for use include ultrapure water. On this occasion, the concentration of Na ions may be in the range of, for example, 0.01 to 0.1 mol/liter.

Subsequently, the second solution is slowly dripped into the first solution little by little to cause a reaction. During dripping of the second solution into the first solution, the pH of the reaction liquid is shifted to the alkaline side, so that $Fe_{(1-x-ny)}Na_xM_y(OH)_3$ can be coprecipitated as an intermediate. After completion of dripping of the second solution into the first solution, the reaction liquid is agitated at room temperature (25° C.) for a period in the range of 6 to 12 hours. The precipitate is then filtered under reduced pressure, so that the intermediate is obtained as a product.

Subsequently, the obtained product is dispersed in ethanol, methanol, or ultrapure water once again, and agitated. The product is then washed through filtration under reduced pressure, so that impurities are removed. The washing may be performed one to three times as needed, so that a Na content in the obtained product can be controlled by the type of solvent and the number of times of washing.

Subsequently, the obtained product is dried under reduced pressure atmosphere kept at a temperature in the range of 70 to 90° C. for a time period in the range of 8 to 24 hours, so that the powder of $Fe_{(1-x-ny)}Na_xM_y(OH)_3$ can be obtained as an intermediate.

Subsequently, onto the intermediate powder in an amount in the range of 10 to 500 g, 10 to 3000 milliliter of HF aqueous solution is slowly dripped with agitation for a reaction. The concentration of the HF aqueous solution may be, for example, in the range of 10 to 50 mass %. After completion of dripping of the HF aqueous solution, the reaction liquid is agitated at room temperature (25° C.) for a time period in the range of 3 to 10 hours, and further agitated on an oil bath at a temperature of 75° C. for a time period of 5 to 12 hours.

After completion of the agitation, the precipitate is separated with a centrifugal machine. The obtained precipitate is dried, for example, by being held on a hot plate heated at a temperature of 50° C. for 8 hours, so that the powder of $Fe_{(1-x-ny)}Na_xM_yF_{(3-2(x+ny))}\cdot3H_2O$ can be obtained. Subsequently, the obtained powder of $Fe_{(1-x-ny)}Na_xM_yF_{(3-2(x+ny))}\cdot3H_2O$ is kept and baked under an inert atmosphere at a temperature in the range of 160 to 500° C. for a time period of 0.5 to 24 hours, so that the powder of $Fe_{(1-x-ny)}Na_xM_yF_{(3-2(x+ny))}$ can be obtained.

In the case of y=0 in the general formula $Fe_{(1-x-ny)}Na_xM_yF_{(3-2(x+ny))}$, metal fluorides including no metal element M, represented by a general formula $Fe_{(1-x)}Na_xF_{(3-2x)}$, can be obtained by exactly the same procedure as described above, except that no chloride hydrate which contains ions of metal M is dissolved in the first solution.

Examples and Comparative Examples are shown in the following.

Example 1

First, iron chloride hexahydrate was dissolved in ultrapure water, so as to prepare a first solution with an iron ion concentration of 0.1 mol/liter. Subsequently, NaOH was dissolved in ultrapure water, so as to prepare a second solution with a Na ion concentration of 0.1 mol/liter.

Subsequently, 458 g of the second solution was slowly dripped into 169 g of the first solution little by little in 3 hours to cause a reaction. After completion of dripping of the second solution into the first solution, the reaction liquid was agitated at room temperature (25° C.) for a time period of 12 hours. The precipitate was then filtered under reduced pressure, so that a product was obtained.

Subsequently, the obtained product was dispersed in ultrapure water once again. The product was washed through filtration under reduced pressure, so that impurities were removed. The washing was repeated two times.

Subsequently, the obtained product was dried under reduced pressure atmosphere kept at a temperature of 80° C. for 12 hours, so that 15 g of the powder of $Fe_{(1-x)}Na_x(OH)_3$ was obtained as an intermediate.

Subsequently, onto 15 g of the intermediate powder, 100 milliliters of 40 mass % HF aqueous solution was slowly dripped with agitation for a reaction. After completion of dripping of the HF aqueous solution, the reaction liquid was agitated at room temperature (25° C.) for 6 hours, and further agitated on an oil bath at a temperature of 75° C. for 12 hours.

After completion of the agitation, the precipitate was separated with a centrifugal machine. The obtained precipitate was kept and dried on a hot plate heated at a temperature of 50° C. for 8 hours, so that the powder of $Fe_{(1-x)}Na_xF_{(3-2x)}\cdot3H_2O$ was obtained.

Subsequently, the obtained powder of $Fe_{(1-x)}Na_xF_{(3-2x)}\cdot3H_2O$ was kept and baked under Ar atmosphere at a temperature of 350° C. for 12 hours in a tubular furnace, so that the powder of $Fe_{(1-x)}Na_xF_{(3-2x)}$ was obtained.

Subsequently, the X-ray diffraction (XDR) pattern of the powder of $Fe_{(1-x)}Na_xF_{(3-2x)}$ obtained in the present Example was measured and the amorphous state was confirmed. The results are shown in FIG. 1.

Furthermore, the composition of $Fe_{(1-x)}Na_xF_{(3-2x)}$ obtained in the present Example was analyzed to be $Fe_{0.987}Na_{0.013}F_{2.97}$ (x=0.013) by an inductively coupled plasma atomic emission spectrophotometer (IPS-AES).

Subsequently, the powder of $Fe_{0.987}Na_{0.013}F_{2.97}$ obtained in the present Example and Ketjenblack as a conductive auxiliary agent (made by Lion Corporation, trade name: KETJENBLACK EC600JD) were mixed at a mass ratio of 85:15. The obtained mixture was pulverized with a planetary ball mill at 360 rpm for 1 hour, so that a composite material including the powder of $Fe_{0.987}Na_{0.013}F_{2.97}$ as cathode active material and the conductive auxiliary agent.

Subsequently, 0.111 g of polyvinylidene fluoride (PVDF) and 1.28 g of N-methyl-2-pyrrolidone (NMP) were added to 1 g of the composite material, and mixed by a planetary centrifugal mixer so as to produce a slurry. The obtained slurry was applied to a current collector made of aluminum foil, which was dried at a temperature of 150° C. for 12 hours, and then pressed with a roll press. A cathode having a diameter of 14 mm was thus formed.

Subsequently, a Li foil having a diameter of 15 mm and a thickness of 0.1 mm was stuck onto a current collector composed of an SUS plate having a diameter of 15 mm and a thickness of 0.3 mm to which an SUS mesh (100 mesh) having a diameter of 15 mm was welded, so that an anode was produced.

Subsequently, the cathode and the anode were laminated through a separator made of a polypropylene fine porous film having a diameter of 17 mm and a thickness of 0.25 mm. Subsequently, the separator was impregnated with a non-aqueous electrolyte, so that a coin-shaped non-aqueous electrolyte secondary battery was obtained. The non-aqueous electrolyte for use was a solution of $LiPF_6$ as supporting salt dissolved in a mixed solvent composed of a mixture of ethylene carbonate and diethyl carbonate with a mass ratio of 7:3, at a concentration of 1 mol/liter.

Figure 2:
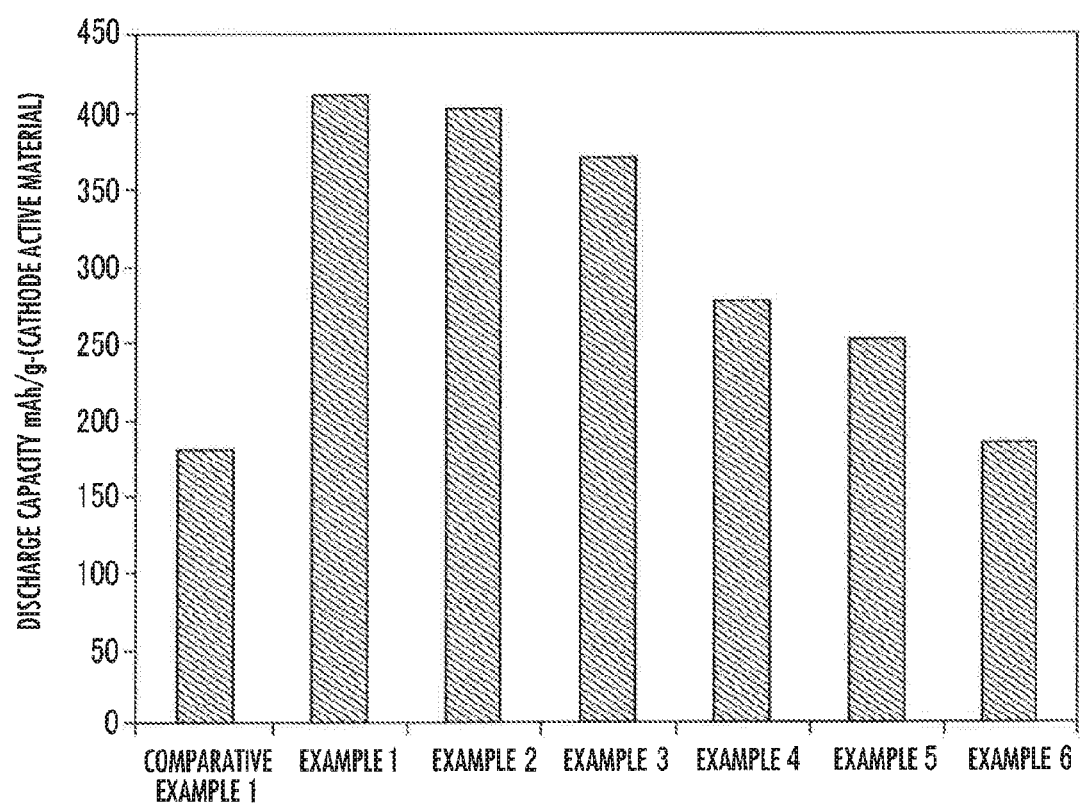
FIG. 2 is a graph showing discharge capacities of metal fluorides in Examples 1 to 6 of the present invention.

Subsequently, the charge and discharge characteristics of the coin-shaped non-aqueous electrolyte secondary battery obtained in the present Example were measured. The measurement was performed under atmosphere at room temperature (25° C.), with a voltage relative to Li in the range of 1.5 to 4.5 V, and a current of 0.6 mA. This corresponds to 0.03 C (discharge time: 33.3 hours) in terms of C-rate. Subsequently, the discharge capacity was obtained from the discharge curve for the second cycle after the start of the charge/discharge testing among the obtained charge/discharge curves. The results are shown in FIG. 2.

Example 2

In the present Example, the powder of $Fe_{(1-x)}Na_xF_{(3-2x)}$ was obtained exactly in the same way as in Example 1, except that the reaction product between the first solution and the second solution was washed with methanol instead of ultrapure water.

Subsequently, the composition of $Fe_{(1-x)}Na_xF_{(3-2x)}$ obtained in the present Example was analyzed to be $Fe_{0.977}Na_{0.023}F_{2.95}$ (x=0.023) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.977}Na_{0.023}F_{2.95}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 2.

Example 3

In the present Example, the powder of $Fe_{(1-x)}Na_xF_{(3-2x)}$ was obtained exactly in the same way as in Example 2, except that the number of times of washing of the reaction product between the first solution and the second solution was one.

Subsequently, the composition of $Fe_{(1-x)}Na_xF_{(3-2x)}$ obtained in the present Example was analyzed to be $Fe_{0.952}Na_{0.048}F_{2.9}$ (x=0.048) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.952}Na_{0.048}F_{2.9}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 2.

Example 4

In the present Example, the powder of $Fe_{(1-x)}Na_xF_{(3-2x)}$ was obtained exactly in the same way as in Example 1, except that the reaction product between the first solution and the second solution was washed with ethanol instead of ultrapure water.

Subsequently, the composition of $Fe_{(1-x)}Na_xF_{(3-2x)}$ obtained in the present Example was analyzed to be $Fe_{0.922}Na_{0.078}F_{2.84}$ (x=0.078) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.922}Na_{0.078}F_{2.84}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 2.

Example 5

In the present Example, the powder of $Fe_{(1-x)}Na_xF_{(3-2x)}$ was obtained exactly in the same way as in Example 4, except that the number of times of washing of the reaction product between the first solution and the second solution was one.

Subsequently, the composition of $Fe_{(1-x)}Na_xF_{(3-2x)}$ obtained in the present Example was analyzed to be $Fe_{0.868}Na_{0.132}F_{2.74}$ (x=0.132) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.868}Na_{0.132}F_{2.74}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 2.

Example 6

In the present Example, the reaction product between the first solution and the second solution was washed with ethanol instead of ultrapure water, and the filtrate obtained by filtration under reduced pressure after washing was evaporated to dryness, so that a solid precipitate was obtained.

Subsequently, the powder of $Fe_{(1-x)}Na_xF_{(3-2x)}$ was obtained exactly in the same way as in Example 1, except that the solid precipitate was used instead of the reaction product between the first solution and the second solution after washing.

Subsequently, the composition of $Fe_{(1-x)}Na_xF_{(3-2x)}$ obtained in the present Example was analyzed to be $Fe_{0.6}Na_{0.4}F_{2.2}$ (x=0.4) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.6}Na_{0.4}F_{2.2}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 2.

Example 7

In the present Example, the powder of $Fe_{(1-x-2y)}Na_xCu_yF_{(3-2(x+2y))}$ was obtained exactly in the same way as in Example 1, except that iron chloride hexahydrate and copper chloride hexahydrate were dissolved in ultrapure water so as to prepare a first solution containing iron ions at a concentration of 0.1 mol/liter and copper ions in an amount of 5 atom % relative to iron ions.

Subsequently, the X-ray diffraction (XRD) pattern of the powder of $Fe_{(1-x-2y)}Na_xCu_yF_{(3-2(x+2y))}$ obtained in the present Example was measured and the amorphous state was confirmed. The results are shown in FIG. 1.

Subsequently, the composition of $Fe_{(1-x-2y)}Na_xCu_yF_{(3-2(x+2y))}$ obtained in the present Example was analyzed to be $Fe_{0.914}Na_{0.022}Cu_{0.032}F_{2.83}$ (x=0.022, y=0.032) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.914}Na_{0.022}Cu_{0.032}F_{2.83}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 3.

Example 8

In the present Example, the powder of $Fe_{(1-x-2y)}Na_xCo_yF_{(3-2(x+2y))}$ was obtained exactly in the same way as in Example 7, except that copper chloride hexahydrate was replaced with cobalt chloride hexahydrate.

Subsequently, the X-ray diffraction (XRD) pattern of the powder of $Fe_{(1-x-2y)}Na_xCo_yF_{(3-2(x+2y))}$ obtained in the present Example was measured and the amorphous state was confirmed. The results are shown in FIG. 1.

Subsequently, the composition of $Fe_{(1-x-2y)}Na_xCo_yF_{(3-2(x+2y))}$ obtained in the present Example was analyzed to be $Fe_{0.883}Na_{0.011}Co_{0.053}F_{2.77}$ (x=0.011, y=0.053) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.883}Na_{0.011}Co_{0.053}F_{2.77}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 3.

Example 9

In the present Example, the powder of $Fe_{(1-x-y)}Na_xMg_yF_{(3-2(x+y))}$ was obtained exactly in the same way as in Example 7, except that copper chloride hexahydrate was replaced with magnesium chloride hexahydrate.

Subsequently, the X-ray diffraction (XRD) pattern of the powder of $Fe_{(1-x-y)}Na_xMg_yF_{(3-2(x+y))}$ obtained in the present Example was measured and the amorphous state was confirmed. The results are shown in FIG. 1.

Subsequently, the composition of $Fe_{(1-x-y)}Na_xMg_yF_{(3-2(x+y))}$ obtained in the present Example was analyzed to be $Fe_{0.800}Na_{0.129}Mg_{0.071}F_{2.6}$ (x=0.129, y=0.071) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.800}Na_{0.129}Mg_{0.071}F_{2.6}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 3.

Example 10

In the present Example, the powder of $Fe_{(1-x-3y)}Na_xAl_yF_{(3-2(x+3y))}$ was obtained exactly in the same way as in Example 1, except that copper chloride hexahydrate was replaced with aluminum chloride hexahydrate.

Subsequently, the X-ray diffraction (XRD) pattern of the powder of $Fe_{(1-x-3y)}Na_xAl_yF_{(3-2(x+3y))}$ obtained in the present Example was measured and the amorphous state was confirmed. The results are shown in FIG. 1.

Subsequently, the composition of $Fe_{(1-x-3y)}Na_xAl_yF_{(3-2(x+3y))}$ obtained in the present Example was analyzed to be $Fe_{0.742}Na_{0.150}Al_{0.036}F_{2.484}$ (x=0.150, y=0.036) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.742}Na_{0.150}Al_{0.036}F_{2.484}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 3.

Example 11

In the present Example, the powder of $Fe_{(1-x-2y)}Na_xNi_yF_{(3-2(x+2y))}$ was obtained exactly in the same way as in Example 7, except that copper chloride hexahydrate was replaced with nickel chloride hexahydrate.

Subsequently, the X-ray diffraction (XRD) pattern of the powder of $Fe_{(1-x-2y)}Na_xNi_yF_{(3-2(x+2y))}$ obtained in the present Example was measured and the amorphous state was confirmed. The results are shown in FIG. 1.

Subsequently, the composition of $Fe_{(1-x-2y)}Na_xNi_yF_{(3-2(x+2y))}$ obtained in the present Example was analyzed to be $Fe_{0.833}Na_{0.043}Ni_{0.062}F_{2.67}$ (x=0.043, y=0.062) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.833}Na_{0.043}Ni_{0.062}F_{2.67}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 3.

Example 12

In the present Example, the powder of $Fe_{(1-x-2y)}Na_xZn_yF_{(3-2(x+2y))}$ was obtained exactly in the same way as in Example 7, except that copper chloride hexahydrate was replaced with zinc chloride hydrate.

Subsequently, the X-ray diffraction (XRD) pattern of the powder of $Fe_{(1-x-2y)}Na_xZn_yF_{(3-2(x+2y))}$ obtained in the present Example was measured and the amorphous state was confirmed. The results are shown in FIG. 1.

Subsequently, the composition of $Fe_{(1-x-2y)}Na_xZn_yF_{(3-2(x+2y))}$ obtained in the present Example was analyzed to be $Fe_{0.890}Na_{0.07}Zn_{0.020}F_{2.78}$ (x=0.007, y=0.020) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.890}Na_{0.07}Zn_{0.020}F_{2.78}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 3.

Example 13

In the present Example, the powder of $Fe_{(1-x-2y)}Na_xSn_yF_{(3-2(x+2y))}$ was obtained exactly in the same way as in Example 7, except that copper chloride hexahydrate was replaced with tin chloride dihydrate.

Subsequently, the X-ray diffraction (XRD) pattern of the powder of $Fe_{(1-x-2y)}Na_xSn_yF_{(3-2(x+2y))}$ obtained in the present Example was measured and the amorphous state was confirmed. The results are shown in FIG. 1.

Subsequently, the composition of $Fe_{(1-x-2y)}Na_xSn_yF_{(3-2(x+2y))}$ obtained in the present Example was analyzed to be $Fe_{0.938}Na_{0.42}Sn_{0.010}F_{2.88}$ (x=0.042, y=0.010) by the inductively coupled plasma atomic emission spectrophotometer (IPS-AES).

Subsequently, a coin-shaped non-aqueous electrolyte secondary battery was obtained exactly in the same way as in Example 1, except that the powder of $Fe_{0.938}Na_{0.42}Sn_{0.010}F_{2.88}$ obtained in the present Example was used.

Subsequently, the charge and discharge characteristics were measured exactly in the same way as in Example 1, except that the coin-shaped non-aqueous electrolyte secondary battery obtained in the present Example was used. The results are shown in FIG. 3.

Comparative Example 1

In the present Comparative Example, the X-ray diffraction (XRD) pattern of the powder of $FeF_3$ (made by Sigma-Aldrich Corporation) was first measured. The results are shown in FIG. 1.

Subsequently, a coin-shaped non-aqueous electrolyte secondary battery was obtained exactly in the same way as in Example 1, except that the powder of $FeF_3$ was used.

Subsequently, the charge and discharge characteristics were measured exactly in the same way as in Example 1, except that the coin-shaped non-aqueous electrolyte secondary battery obtained in the present Comparative Example was used. The results are shown in FIGS. 2 and 3.

From FIG. 1, it is evident that the powder of $FeF_3$ is in a crystalline state, having a sharp peak at 2θ=23.9°; while it is evident that any of the metal fluorides in Examples 1, and 7 to 13 is in an amorphous state, having a broad peak at 2θ=23.9°.

From FIG. 2, it is evident that the amorphous metal fluorides represented by a general formula $Fe_{(1-x)}Na_xF_{(3-2x)}$ (0<x≤0.4) in Examples 1 to 6 have a discharge capacity larger than that of $FeF_3$ powder, as a cathode active material. It is also evident that in the case of 0<x≤0.05 for the general formula $Fe_{(1-x)}Na_xF_{(3-2x)}$ (Examples 1 to 3), a particularly large discharge capacity is achieved.

From FIG. 3, it is also evident that the amorphous metal fluorides represented by a general formula $Fe_{(1-x-ny)}Na_xM_yF_{3-2(x+ny)}$ (wherein M represents a metal element selected from the group consisting of Co, Ni, Cu, Mg, Al, Zn, and Sn, n represents an oxidation number of the metal element M, 0<x≤0.150, and 0≤y≤0.071) in Examples 7 to 13 have a discharge capacity larger than that of $FeF_3$ powder, as a cathode active material. It is also evident that in the case of the metal element M of Cu (Example 7), Co (Example 8), or Sn (Example 13) in a general formula $Fe_{(1-x-ny)}Na_xM_yF_{3-2(x+ny)}$, a particularly large discharge capacity is achieved.

What is claimed is:

1. A cathode active material for use in secondary batteries with a non-aqueous electrolyte comprising:
an amorphous metal fluoride represented by a general formula $Fe_{(1-x-ny)}Na_xM_yF_{(3-2(x+ny))}$, wherein M is a metal element selected from a group consisting of Co, Ni, Cu, Al, Zn, and Sn, n represents an oxidation number of the metal element M, 0<x≤0.4, y≠0, and y≤0.1.

2. A cathode active material for use in secondary batteries with a non-aqueous electrolyte comprising:
an amorphous metal fluoride represented by a general formula $Fe_{(1-x-ny)}Na_xM_yF_{(3-2(x+ny))}$, wherein M is a metal element selected from a group consisting of Co, Cu, and Sn, n represents an oxidation number of the metal element M, 0<x≤0.4, y≠0, and y≤0.1.

* * * * *